United States Patent
Bloch et al.

(10) Patent No.: US 7,013,458 B2
(45) Date of Patent: Mar. 14, 2006

(54) METHOD AND APPARATUS FOR ASSOCIATING METADATA ATTRIBUTES WITH PROGRAM ELEMENTS

(75) Inventors: Joshua J. Bloch, San Jose, CA (US); Graham Hamilton, Palo Alto, CA (US)

(73) Assignee: Sun Microsystems, Inc., Santa Clara, CA (US)

(*) Notice: Subject to any disclaimer, the term of this patent is extended or adjusted under 35 U.S.C. 154(b) by 571 days.

(21) Appl. No.: 10/237,886

(22) Filed: Sep. 9, 2002

(65) Prior Publication Data

US 2004/0049766 A1 Mar. 11, 2004

(51) Int. Cl.
*G06F 9/45* (2006.01)
(52) U.S. Cl. .................. 717/143; 717/117; 717/142; 715/513
(58) Field of Classification Search ........ 717/106–119, 717/141–143, 146–147; 715/513, 760
See application file for complete search history.

(56) References Cited

U.S. PATENT DOCUMENTS 5,804,803 A * 9/1998 Cragun et al. ............... 235/375
6,311,194 B1 * 10/2001 Sheth et al. ................. 715/505
6,574,635 B1 * 6/2003 Stauber et al. .......... 707/103 R
6,636,863 B1 * 10/2003 Friesen ....................... 707/102

OTHER PUBLICATIONS

Cox et al., "A Model Independent Source Code Repository", ACM—Proceedings of the 1999 conference of the Centre for Advanced Studies on Collaborative research, pp. 1-14, 1999.*
Doerig, "Espresso, A Java compiler Written in Java", Boston University, pp.: 1-41, 1998.*
Publication entitled "C# Language Specification," Microsoft Corporation 1999-2001, Chapter 17, http://msdn.microsoft.com/vstudio/techinfo/articles/upgrade/Csharpdownload.asp.

* cited by examiner

Primary Examiner—Ted T. Vo
(74) Attorney, Agent, or Firm—Park, Vaughan & Fleming LLP

(57) ABSTRACT

One embodiment of the present invention provides a system for associating metadata attributes with program elements. During operation, the system receives source code containing syntactic elements that specify metadata attributes for program elements, wherein the metadata attributes do not affect program execution. The system then parses the source code to obtain the metadata attributes. Next, the system associates the metadata attributes with corresponding program elements and determines values associated with the metadata attributes. Finally, the system incorporates the metadata attributes, including identifiers for the associated values and the associated program elements, into object code for the program, thereby allowing the metadata attributes to be accessed from the object code. Another embodiment of the present invention provides a system for accessing metadata attributes for program elements from object code through an application programming interface (API).

23 Claims, 3 Drawing Sheets

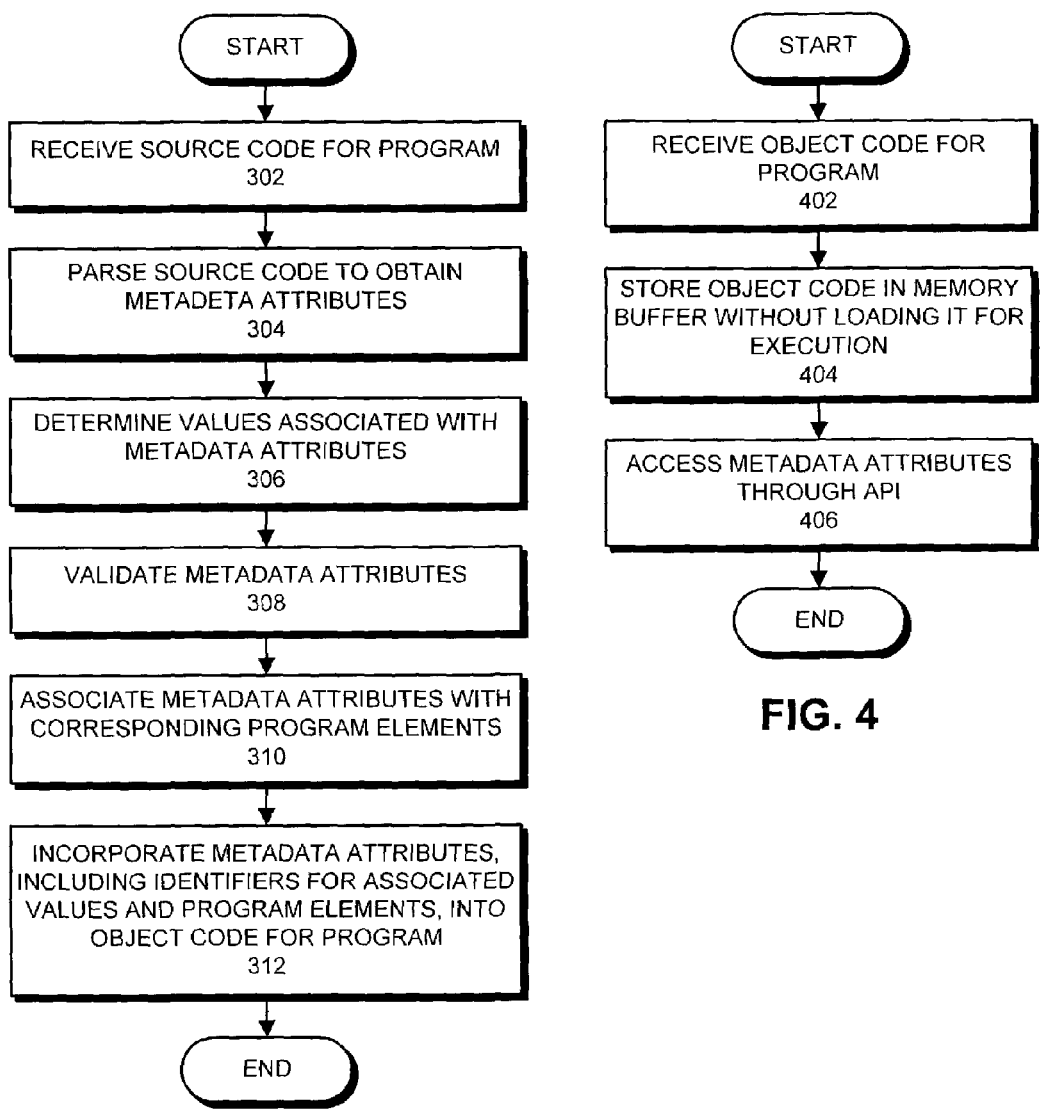

METHOD AND APPARATUS FOR ASSOCIATING METADATA ATTRIBUTES WITH PROGRAM ELEMENTS

BACKGROUND

1. Field of the Invention

The present invention relates to the design of programming languages for computer systems and associated development tools. More specifically, the present invention relates to a method and an apparatus for associating metadata attributes that do not affect program execution with program elements.

2. Related Art

It is often desirable for programmers to annotate program elements, such as fields, methods, and classes, as having particular attributes that indicate that they should be processed in special ways by development tools, deployment tools, or run-time libraries. We call such annotations "metadata." Ideally, this metadata should be easily accessible at development time, deployment time, and run time.

Metadata has many uses. Custom tools may use metadata to generate auxiliary source files to be used in conjunction with the source file containing the annotation. For example, a stub generator can generate remote procedure call stubs based on annotations indicating that certain methods are designed for remote use.

A number of existing mechanisms presently allow programmers to associate metadata with programs. For example, the C++ programming language has a preprocessor directive called "#pragma" that affects the actions of the compiler as it compiles the program. Some uses of this directive associate metadata with the program. For example, this directive's COPYRIGHT function associates a copyright string with a program. The copyright string is then embedded in the object code where it can be read with the Unix strings utility. However, the C++ #pragma directive does not allow the programmer to associate arbitrary metadata, does not allow metadata to be associated with particular program elements, and does not allow metadata to be read at run time.

JAVA's doclet API has been used to associate metadata with program elements by various tools such as ejbdoclet, webdoclet, ejbgen, and icontract. Although this usage does allow the programmer to associate arbitrary metadata with particular program elements, it does not allow metadata to be read at run time, nor does it provide a mechanism to manage the namespace of metadata attributes.

Hence, what is needed is a facility that allows programmers to associate arbitrary metadata with arbitrary program elements in a manner that allows the metadata to be accessed by development tools, deployment tools, and programmatically at runtime without the limitations of the mechanisms described above.

SUMMARY

One embodiment of the present invention provides a system for associating metadata attributes with program elements. During operation, the system receives source code containing syntactic elements that specify metadata attributes for program elements, wherein the metadata attributes do not affect program execution. The system then parses the source code to obtain the metadata attributes. Next, the system associates the metadata attributes with corresponding program elements and determines values associated with the metadata attributes. Finally, the system incorporates the metadata attributes, including identifiers for the associated values and the associated program elements, into object code for the program, thereby allowing the metadata attributes to be accessed from the object code.

In a variation on this embodiment, a metadata attribute for a program element is expressed in the source code as a modifier for a declaration for the program element.

In a variation on this embodiment, a given metadata attribute can contain nested metadata attributes.

In a variation on this embodiment, a given metadata attribute is defined by a corresponding class for the given metadata attribute.

In a variation on this embodiment, the corresponding class for the given metadata attribute is located in a package named according to a unique package naming convention. This allows parties to define their own metadata attributes that are guaranteed not to interfere with attributes defined by other parties.

In a variation on this embodiment, the system additionally validates a given metadata attribute using validation criteria from an object file for a class associated with the given metadata attribute.

In a variation on this embodiment, determining values associated with the metadata attributes involves evaluating constant expressions.

In a variation on this embodiment, the object code for the program includes one or more class files for the program.

In a variation on this embodiment, a program element can include, a method, a class, and or a field.

One embodiment of the present invention provides a system for accessing metadata attributes associated with program elements. During operation, the system receives object code for a program, wherein the object code contains metadata attributes for program elements; these the metadata attributes do not affect program execution. Next, the system stores the object code in a memory buffer without loading the object code for program execution. The system then accesses the metadata attributes for the program elements from the object code through an application programming interface (API).

In a variation on this embodiment, the API includes: a method that returns a specified attribute of a specified element; a method that returns all attributes of a specified element; a method that returns all elements having a specified attribute; and a method that returns all elements having a specified attribute-value pair.

BRIEF DESCRIPTION OF THE FIGURES

FIG. 3 is a flow chart illustrating the process of incorporating metadata attributes for program elements into object code in accordance with an embodiment of the present invention.

FIG. 4 is a flow chart of the process of accessing metadata attributes associated with program elements in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Computer System

Figure 1:
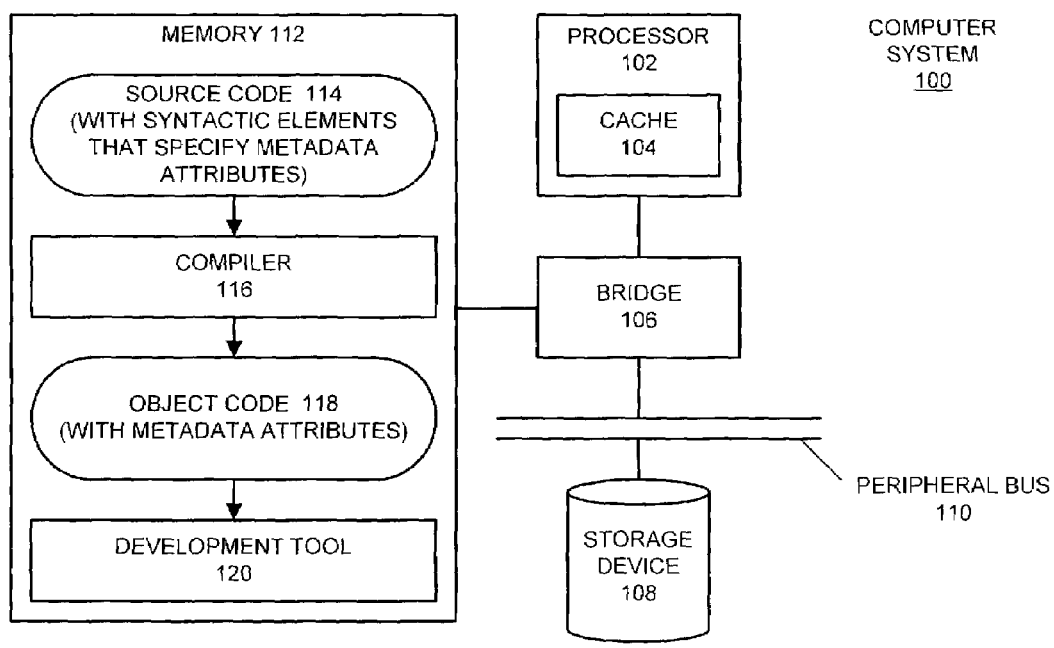
FIG. 1 illustrates a computer system in accordance with an embodiment of the present invention.

FIG. 1 illustrates a computer system 100 in accordance with an embodiment of the present invention. As illustrated in FIG. 1, computer system 100 includes processor 102, which is coupled to a memory 112 and to peripheral bus 110 through bridge 106. Bridge 106 can generally include any type of circuitry for coupling components of computer system 100 together.

Processor 102 can include any type of processor, including, but not limited to, a microprocessor, a mainframe computer, a digital signal processor, a personal organizer, a device controller and a computational engine within an appliance. Processor 102 includes a cache 104 that stores code and data for execution by processor 102.

Processor 102 communicates with storage device 108 through bridge 106 and peripheral bus 110. Storage device 108 can include any type of non-volatile storage device that can be coupled to a computer system. This includes, but is not limited to, magnetic, optical, and magneto-optical storage devices, as well as storage devices based on flash memory and/or battery-backed up memory.

Processor 102 communicates with memory 112 through bridge 106. Memory 112 can include any type of memory that can store code and data for execution by processor 102.

As illustrated in FIG. 1, memory 112 contains compiler 116. Compiler 116 converts source code 114 into object code 118. In doing so, compiler 116 incorporates metadata attributes that are specified by syntactic elements within source code 114 into object code 118. This process is described in more detail below with reference to FIG. 3.

Incorporating metadata into object code enables development tool 120 to access the metadata attributes from object code 118 through an API. This process is described in more detail below with reference to FIG. 4.

Note that although the present invention is described in the context of computer system 100 illustrated in FIG. 1, the present invention can generally operate on any type of computing device. Hence, the present invention is not limited to the specific implementation of computer system 100 illustrated in FIG. 1.

Compiler

Figure 2:
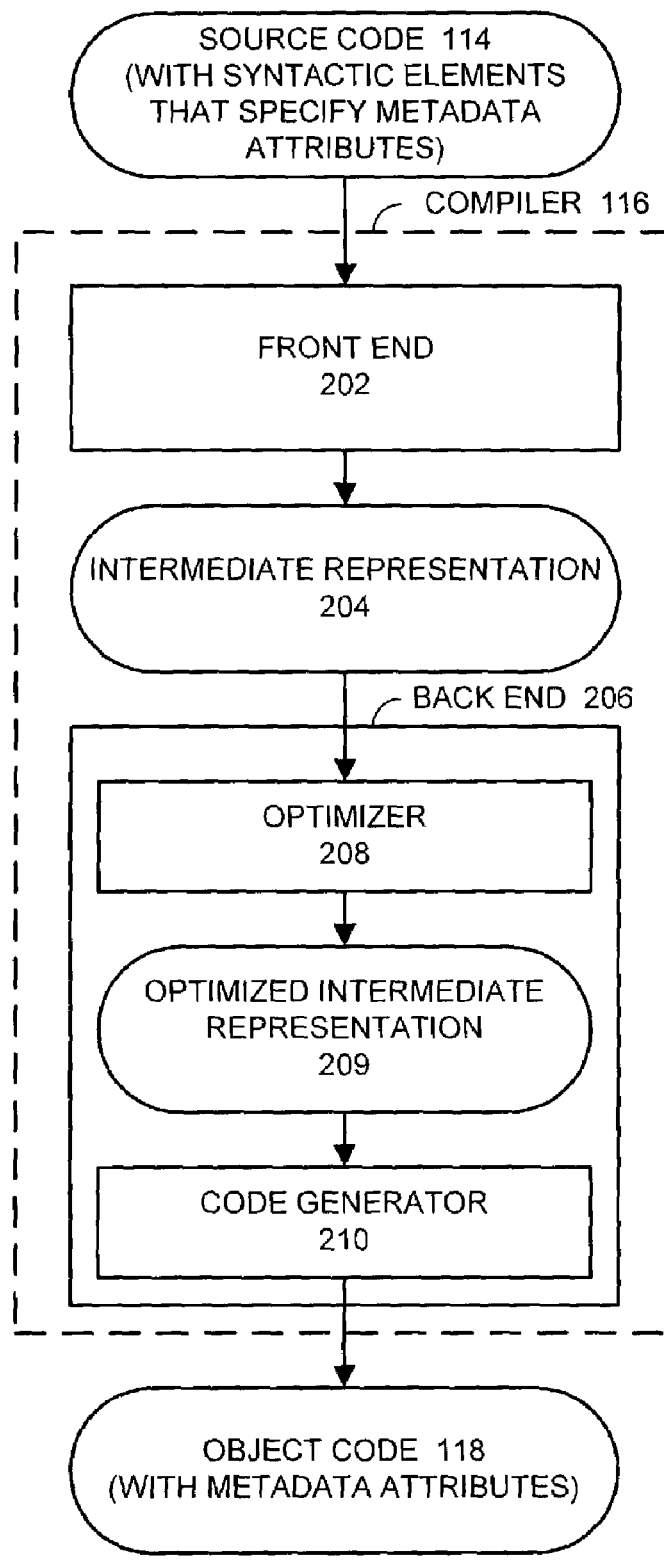
FIG. 2 illustrates the structure of a compiler in accordance with an embodiment of the present invention.

FIG. 2 illustrates the structure of compiler 116 in accordance with an embodiment of the present invention. Compiler 116 takes as input source code 114 and outputs object code 118. Note that source code 114 may include any computer program written in a high-level programming language, such as the JAVA programming language. Object code 118 includes executable instructions for a specific virtual machine or a specific processor architecture.

Compiler 116 includes a number of components, including front end 202 and back end 206. Front end 202 takes in source code 114 and parses source code 114 to produce intermediate representation 204.

Intermediate representation 204 feeds into back end 206, which produces object code 118. Within backend 206, intermediate representation 204 feeds through optimizer 208, and the resulting optimized intermediate representation 209 feeds though code generator 210 which produces object code 118.

During this process, compiler 116 incorporates metadata attributes into object code 118 as is described below with reference to FIG. 3.

Process of Incorporating Metadata into Object Code

FIG. 3 is a flow chart illustrating the process of incorporating metadata attributes for program elements in object code in accordance with an embodiment of the present invention. The system starts by receiving source code for a program, wherein the source code contains syntactic elements that specify metadata attributes for program elements (step 302). Note that the metadata attributes do not effect program execution.

The program elements can include methods, classes or fields that can be associated with attributes. For example, a method can be associated with attributes, such as: (1) a remote attribute that specifies whether the method is a remote method or a local method; (2) a precondition attribute and a postcondition attribute that collectively facilitate "design by contract;" (3) a deprecated attribute which indicates that a given method is supported, but should no longer be used; or (4) a query attribute that facilitates forming a database query for an accessor method.

A class can be associated with attributes, such as: (1) an author attribute that identifies the author of the class; (2) a deprecated attribute, which indicates that the class is supported, but should no longer be used; and (3) a framework membership attribute that signifies that the class participates in a framework.

A field can have attributes, such as a persistence attribute, which indicates whether or not the field is persistent. Note that this persistence attribute can be a boolean attribute, or alternatively a multi-valued attribute that specifies a type of persistence.

Next, the system parses the source code to obtain metadata attributes (step 304). In one embodiment of the present invention, a metadata attribute is expressed in the source code as a modifier associated with a declaration for a program element. In this embodiment, each attribute is declared as a class. For example, an interface for a class associated with "deprecated" attribute can have the form,

```
interface @deprecated extends
    Java.lang.BooleanAttribute{
}.
```

The deprecated attribute is associated with a program element as a modifier for a declaration for the program element. For example, a class can be associated with both the deprecated attribute and the author "Mickey Mouse" in the following way,

```
@deprecated
@author("Mickey Mouse") public static final class Foo extends Bar {
    public static final void main {
    }
}.
```

Note that in the above example, a modifier associated with an attribute can be easily identified by "@" symbol. Also note that multiple attribute modifiers can be associated with a given declaration.

Attributes can also be nested. For example, a "remote" attribute for a class can the specified as follows,

```
@remote(
    @comstyle("Corba"),
    @timeout(10),
) <<method declaration>>.
```

This nested remote attribute specifies that the communication style for the remote method is "Corba" and that the timeout period for the remote method is 10 seconds. Note that this information can be used by a programming tool to build a stub for the remote method.

An interface for a class that defines the nested "remote" attribute can have the form,

```
public interface @remote extends CompoundAttribute {
    public interface @comstyle
        extends java.lang.StringAttribute{ }
    public interface @timeout
        extends java.lang.IntAttribute{ }
    . . .
}
```

Note that by placing the classes that define the attributes in packages named according to a unique package naming convention like the one described in Section 7.7 of the Java(tm) Language specification, Second Edition (Gosling, Joy, Steele, Bracha; Addison-Wesley 2000), the present invention can leverage off the existing namespace management features enabled by the convention. Hence, unrelated parties can define their own classes for their own attributes, and these classes can be located within their own portions of the package namespace. This allows unrelated parties to define different attributes using the same name without interfering with each other.

Next, the system determines values associated with the metadata attributes, which may involve evaluating constant expressions (step 306). After or during the parsing process, the system can validate the metadata attributes (step 308). In one embodiment of the present invention, this involves using validation criteria retrieved from an object file for a class that defines a given metadata attribute to validate the given metadata attribute.

The system then associates metadata attributes with corresponding program elements (step 310). The system then incorporates the metadata attributes, including identifiers for associated values and associated program elements, into object code (class files) for the program (step 312). In one embodiment of the present invention, the metadata attributes are stored as "class file attributes" in a JAVA class.

Process of Accessing Metadata Attributes from Object Code

FIG. 4 is a flow chart of the process of accessing metadata attributes associated with program elements in accordance with an embodiment of the present invention. This process can take place either at run time (while the class is loaded), or at design time (while the class is not loaded).

If the process takes place during run time, one embodiment of the present invention adds an accessor method to class for each primitive type attribute. For example, we can add the following accessor methods to class, String getStringAttribute(name of attribute), and int getIntAttribute(name of attribute).

These accessor methods can be used to retrieve a string and an integer, respectively. For example, "Foo.class.getStringAttribute@author.class)" returns a string for the attribute "author" during run time. However, note that in order to do this the class literal "Foo.class" must be evaluated, which requires loading the class.

If the process takes place during design time, one embodiment of the present invention provides an application programming interface (API) to obtain metadata associated without program elements without having the load the class.

The process operates as follows. Upon receiving object code for a program (step 402), the process loads the object code into a memory buffer—without performing the time-consuming verification operations involved in loading the class into a virtual machine (step 404). Next, the process accesses metadata attributes for program elements through an API (step 406).

Note that API can be defined as a class. For example, the class can include methods to: (1) return a specified attribute of a specified element; (2) return all attributes of a specified element; (3) return all elements having a specified attribute; (4) return all elements having a specified attribute-value pair; (5) return a specified sub-attribute of a complex attribute; and (6) to return all sub-attributes of a complex attribute.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended

What is claimed is:

1. A method for associating metadata attributes with program elements, comprising:

receiving source code for a program, wherein the source code contains syntactic elements that specify metadata attributes for program elements, wherein the metadata attributes do not affect program execution;

parsing the source code to obtain the metadata attributes;

associating the metadata attributes with corresponding program elements;

determining values associated with the metadata attributes; and incorporating the metadata attributes, including identifiers for the associated values and the associated program elements, into object code for the program, thereby allowing the metadata attributes to be accessed from the object code, wherein the process of accessing metadata attributes from the object code takes place at run-time.

2. The method of claim 1, wherein a metadata attribute for a program element is expressed in the source code as a modifier for a declaration for the program element.

3. The method of claim 1, wherein a given metadata attribute can contain nested metadata attributes.

4. The method of claim 1, wherein a given metadata attribute is defined by a corresponding class for the given metadata attribute.

5. The method of claim 4, wherein the corresponding class for the given metadata attribute is located in a package named according to a unique package naming convention, thereby allowing parties to define their own metadata attributes that are guaranteed not to interfere with attributes defined by other parties.

6. The method of claim 4, further comprising validating the given metadata attribute using validation criteria from an object file for a class associated with the given metadata attribute.

7. The method of claim 1, wherein determining values associated with the metadata attributes involves evaluating constant expressions.

8. The method of claim 1, wherein the object code for the program includes one or more class files for the program.

9. The method of claim 1, wherein a program element can include:
  a method;
  a class; and
  a field.

10. A computer-readable storage medium storing instructions that when executed by a computer cause the computer to perform a method for associating metadata attributes with program elements, the method comprising:
  receiving source code for a program, wherein the source code contains syntactic elements that specify metadata attributes for program elements, wherein the metadata attributes do not affect program execution;
  parsing the source code to obtain the metadata attributes;
  associating the metadata attributes with corresponding program elements;
  determining values associated with the metadata attributes; and
  incorporating the metadata attributes, including identifiers for the associated values and the associated program elements, into object code for the program, thereby allowing the metadata attributes to be accessed from the object code, wherein the process of accessing metadata attributes from the object code takes place at run-time.

11. The computer-readable storage medium of claim 10, wherein a metadata attribute for a program element is expressed in the source code as a modifier for a declaration for the program element.

12. The computer-readable storage medium of claim 10, wherein a given metadata attribute can contain nested metadata attributes.

13. The computer-readable storage medium of claim 10, wherein a given metadata attribute is defined by a corresponding class for the given metadata attribute.

14. The computer-readable storage medium of claim 13, wherein the corresponding class for the given metadata attribute is located in a package named according to a unique package naming convention, thereby allowing parties to define their own metadata attributes that are guaranteed not to interfere with attributes defined by other parties.

15. The computer-readable storage medium of claim 13, wherein the method further comprises validating the given metadata attribute using validation criteria from an object file for a class associated with the given metadata attribute.

16. The computer-readable storage medium of claim 10, wherein determining values associated with the metadata attributes involves evaluating constant expressions.

17. The computer-readable storage medium of claim 10, wherein the object code for the program includes one or more class files for the program.

18. The computer-readable storage medium of claim 10, wherein a program element can include:
  a method;
  a class; and
  a field.

19. An apparatus that associates metadata attributes with program elements, comprising:
  a parser that is configured to parse source code to obtain the metadata attributes;
  wherein the source code contains syntactic elements that specify metadata attributes for program elements;
  wherein the metadata attributes do not affect program execution; and
  a metadata processing mechanism that is configured to,
    associate the metadata attributes with corresponding program elements,
    determine values associated with the metadata attributes, and to
    incorporate the metadata attributes, including identifiers for the associated values and the associated program elements, into object code for the program, thereby allowing the metadata attributes to be accessed from the object code, wherein the process of accessing metadata attributes from the object code takes place at run-time.

20. The apparatus of claim 19, wherein a metadata attribute for a program element is expressed in the source code as a modifier for a declaration for the program element.

21. The apparatus of claim 19, wherein a given metadata attribute can contain nested metadata attributes.

22. The apparatus of claim 19, wherein a given metadata attribute is defined by a corresponding class for the given metadata attribute.

23. The apparatus of claim 22, wherein the corresponding class for the given metadata attribute is located in a package named according to a unique package naming convention, thereby allowing parties to define their own metadata attributes that are guaranteed not to interfere with attributes defined by other parties.

* * * * *